United States Patent [19]

Amato

[11] Patent Number: 5,175,694
[45] Date of Patent: Dec. 29, 1992

[54] CENTROID TARGET TRACKING SYSTEM UTILIZING PARALLEL PROCESSING OF DIGITAL DATA PATTERNS

[75] Inventor: Gaetano T. Amato, Silver Spring, Md.

[73] Assignee: The United States of America as represented by The Secretary of the Navy, Washington, D.C.

[21] Appl. No.: 478,815

[22] Filed: Feb. 8, 1990

[51] Int. Cl.⁵ .................................... G06K 9/34
[52] U.S. Cl. .................................. 364/516; 358/125
[58] Field of Search ............. 364/516, 200, 800, 131, 364/424.02; 358/125, 126; 342/90, 91

[56] References Cited

U.S. PATENT DOCUMENTS

| | | | |
|---|---|---|---|
| 3,803,604 | 4/1974 | Case | 343/7.3 |
| 4,270,143 | 5/1981 | Morris | 364/516 |
| 4,384,273 | 5/1983 | Ackland et al. | 364/900 |
| 4,409,661 | 10/1983 | Romanski | 364/516 |
| 4,539,590 | 9/1985 | Gage | 358/125 |
| 4,550,435 | 10/1985 | Hayman | 382/9 |
| 4,713,533 | 12/1987 | Bremer et al. | 356/152 X |
| 4,719,584 | 1/1988 | Rue et al. | 364/516 |
| 4,849,906 | 7/1989 | Chodos et al. | 364/516 |
| 4,958,224 | 9/1990 | Lepore et al. | 364/516 |
| 4,965,732 | 10/1990 | Roy, III et al. | 364/516 |

*Primary Examiner*—Parshotam S. Lall
*Assistant Examiner*—Michael Zianelli
*Attorney, Agent, or Firm*—Kenneth E. Walden; Jacob Shuster

[57] ABSTRACT

Outputs from data bit areas of a target sensing array, above a signal threshold level, are obtained by sequential scanning of groups of the data bit area aligned in columns and rows to form a digital pattern of binary data interrogated to determined the offset of the digital pattern from the centroid of the sensor array. Interrogation is performed by simultaneous counting of data bit pulses derived from separate segments of each group on opposite sides of the centroid and comparing such summations to determine the differences therebetween reflecting directional offsets from the centroid.

7 Claims, 3 Drawing Sheets

5,175,694

CENTROID TARGET TRACKING SYSTEM UTILIZING PARALLEL PROCESSING OF DIGITAL DATA PATTERNS

BACKGROUND OF THE INVENTION

This invention relates to the processing of image data acquired by a target sensor array.

Target sensing arrays carried by missiles, for example, have data processors associated therewith through which image data acquired by the sensor may be interrogated and analyzed. Interrogation of the sensor array involves sequential sampling and storing of information derived from elemental data bit areas on the array during discrete periods of time. Any increase in the number of data bit areas aligned in columns and rows on the sensor area not only involves an enlargement in the size of the array but also causes a geometric increase in data processing time with an accompanying reduction in signal bandwidth limits for the associated system and its ability to respond to specific stimulus. Accordingly, data processing time is critical and may limit use of the associated system, particularly where data resolution requirements dictate an increase in the size of the sensor array.

The use of parallel data processing techniques to reduce data processing time is generally known in the art, but heretofore involved a burdensome increase in hardware presenting another set of problems especially critical in missile installations, where weight, volume and packaging are important factors.

It is therefore an important object of the present invention to provide a data processing system for interrogating image pattern data employing a simplified hardware and parallel processing technique to reduce data processing time.

SUMMARY OF THE INVENTION

In accordance with the present invention, the pulses derived from sequentially scanned groups of data bit areas on a sensor array are divided into half segments of each of such groups and the half segments of each group simultaneously are counted in order to obtain the difference between the summations of such counts with respect to each group. Since the scanned data bits so counted are associated with digital data patterns formed by signal data above a predetermined threshold level, the offset of the digital data patterns from the centroid of the sensor array is reflected by the aforementioned differences between the simultaneous count summations or totals. A directional offset readout is thereby obtained through the data interrogating processor for target tracking purposes with the expenditure of a minimum amount of data processing time and through a simplified hardward arrangement.

Other objects, advantages, and novel features of the invention will become apparent from the following detailed description of the invention when considered in conjunction with the accompanying drawings, wherein:

BRIEF DESCRIPTION OF THE DRAWING FIGURES

Figure 2:
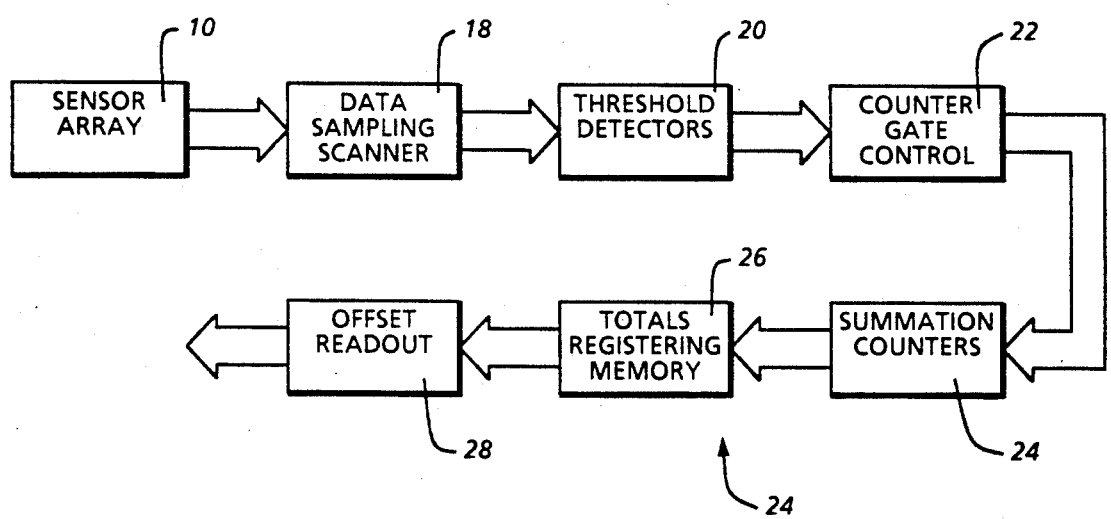
FIG. 2 is a block diagram of the data interrogating processor associated with the system shown in FIG. 1.
Figure 4:
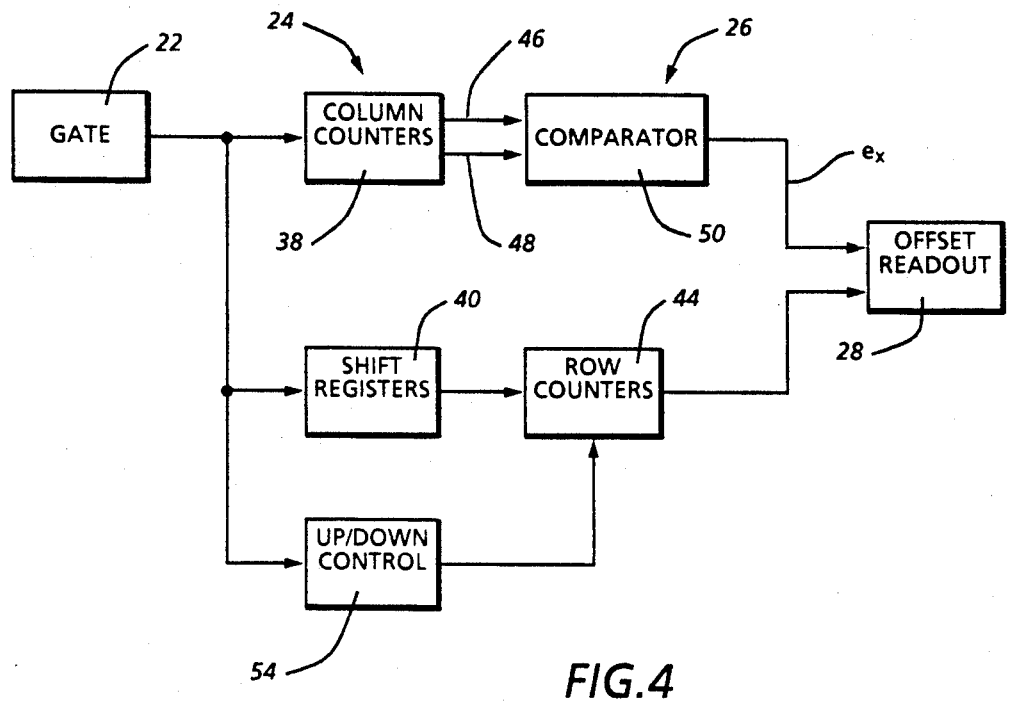

FIG. 4 a block diagram of the data interrogating processor of FIG. 2, shown in greater detail in accordance with one embodiment of the invention.

Figure 5:
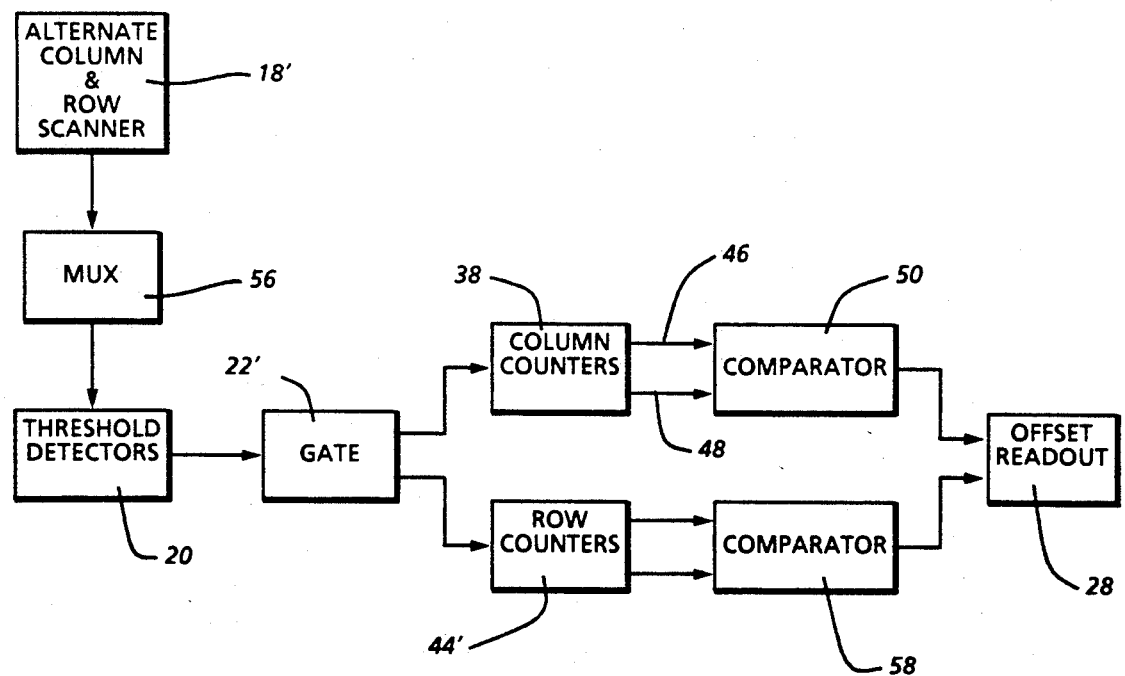
Figure 6:
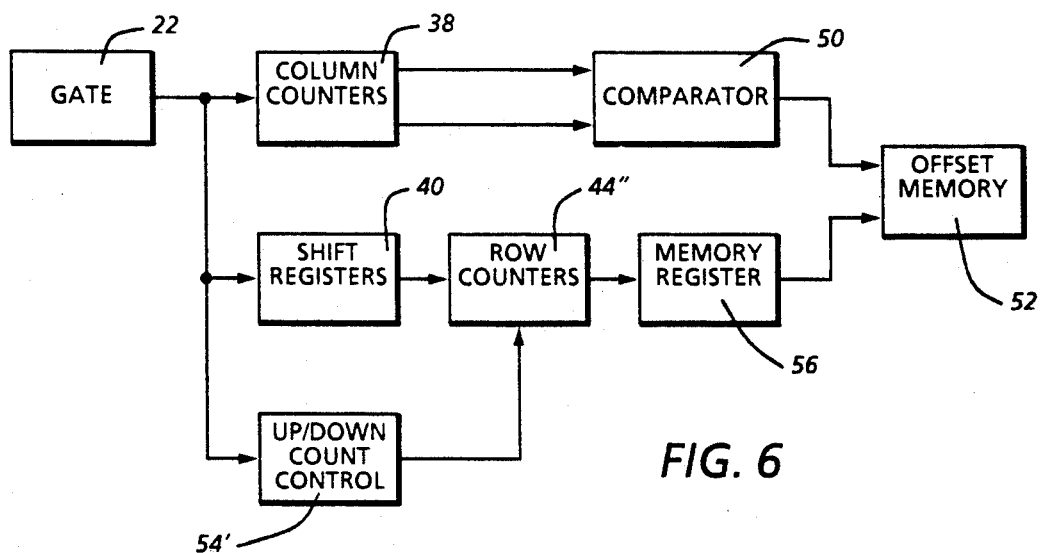

FIGS. 5 and 6 are block diagrams of data interrogating processors in accordance with other embodiments of the invention.

Figure 7:
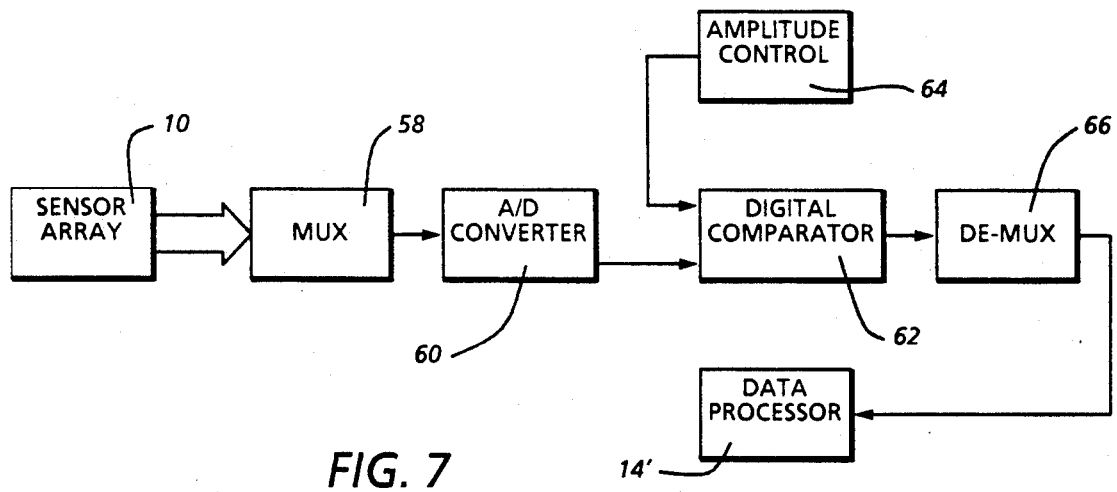
Figure 8:
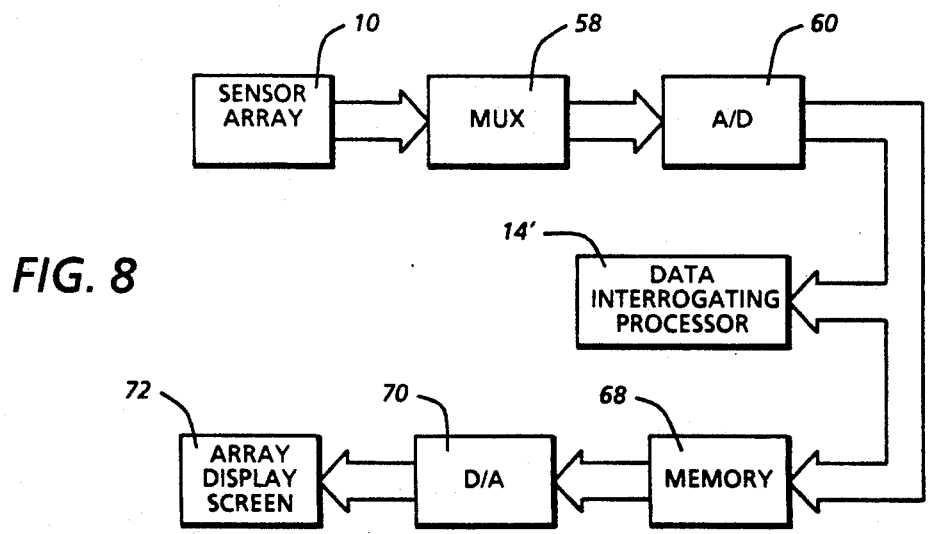

FIGS. 7 and 8 are schematic block diagrams showing yet other embodiments of the invention.

DETAILED DESCRIPTION OF THE PREFERRED EMBODIMENTS

Figure 1:
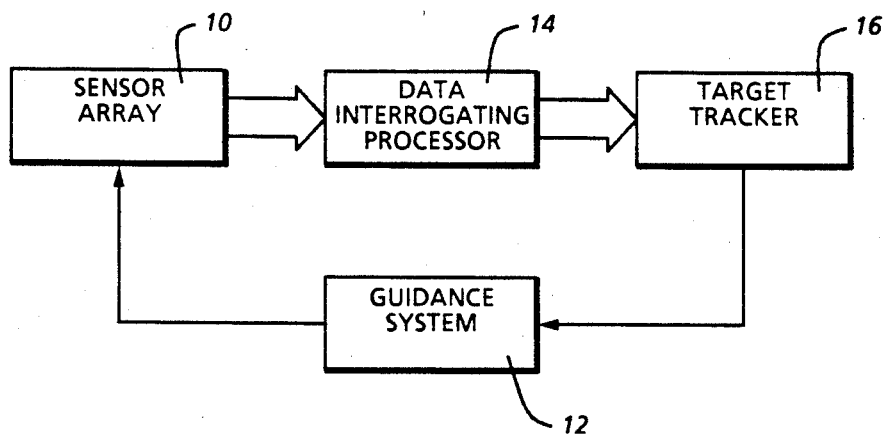
FIG. 1 is a schematic block diagram of a target tracking system with which the present invention may be associated.

Referring now to the drawing in detail, FIG. 1 schematically illustrates a sensor array 10 within which target image information is acquired for tracking purposes. The sensor array may be associated, for example, with some guidance system 12 for anti-missile weapon purposes, autonomous fire fighting equipment or other purposes through which the sensor array is controllably displaced as diagramed in FIG. 1. The acquired data in the sensor array is interrogated by a data processor 14 interfacing the sensor array with a target tracker 16.

In accordance with the present invention, target images are spatially quantitized as binary digital patterns generated by the data processor 14 from the data acquired by the sensor array 10 to track a target image under control of the offset of its aimpoints from the centroid of the sensor array. Such offset is determined in the data processor 14 and fed to the target tracker 16 in order to control corrective displacement of the sensor array so as to reduce the offset.

The data processor 14, as schematically depicted in FIG. 2, includes a data sampling scanner section 18 receiving its input from the sensor array for transmission to a threshold detector section 20. The outputs of the threshold detector section are fed to a counter gate control section 22 through which data bits above a predetermined threshold level as determined in detector section 20, are transferred to a summation counter section 24. Outputs of the summation counters of section 24 are registered and stored within a memory section 26 from which offsets between the aforementioned binary digital patterns and the centroid of the sensor array are calculated and fed to an offset readout section 28.

Figure 3:
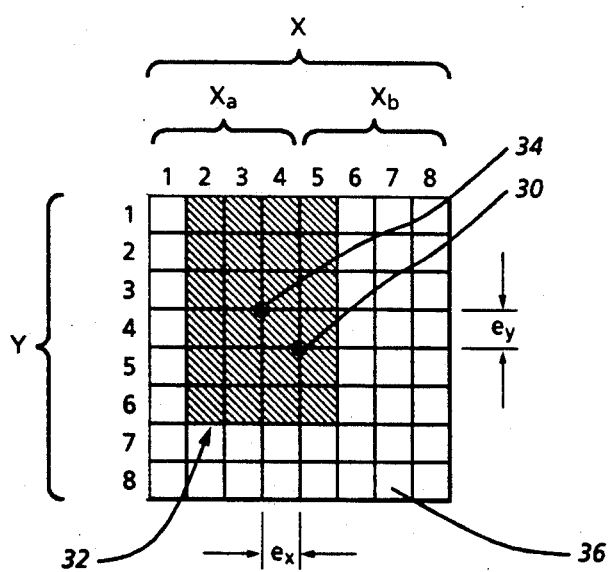
FIG. 3 is a digital data pattern and sensor array diagram.

Referring now to FIG. 3, a typical binary digital pattern 32 is exhibited by way of example on sensor array 10 having its geometric center or aimpoint 34 displaced from the centroid 30 of the array 10 by amounts eX and eY in the direction of the rows X and columns Y. The digital pattern is formed by data bits represented on area portions 36 of the array aligned in N vertical columns Y1, Y2 ... Yn and N horizontal rows X1, X2 ... Xn. The data acquired by the sensor array is sampled through scanner section 18 by reading each of the rows (X) of data bits as bit words aligned in columns (Y). The entire array is thereby read, one column at a time, in a sequence of N time frames with each data bit corresponding to a single area portion 36 of the array.

Each data bit area 36 of the array will have a binary value of "one" when its detection level is above a preset threshold as determined in the threshold detector section 20. When the detection level is below the threshold, the binary value of the data bit will be zero. Thus, the sensor array will exhibit the digital pattern 32, in terms of the data bits of binary value "one" as depicted in FIG. 3, showing those data bit areas above the threshold level covered by cross-hatching lines. The offset of the digital pattern 32 as denoted in FIG. 3 represents offset displacement of pattern center 34 from centroid 30 in the X-direction of the data bit word rows and in the Y-direction of data bit columns, respectively.

The data bits of binary value "one" are each gated through gate control section 22 to the summation counter section 24 to register a count of the binary "one" data bits in the memory section 26 after completion of N time frame cycles. During such counting operation, one segment (Xa) of the group of counted data bits in each row (X), covering one-half of the available data bit areas 36 therein as depicted in FIG. 3, is distinguished from those counted data bits within the other segment (Xb) as the data bits are vertically scanned in columns from left to right of the centroid 30 as viewed in FIG. 3. The difference between respective totals of the simultaneously counted data bits of the segments Xa and Xb are utilized to determine the offset in the X-direction and offset in the Y-direction relative to centroid 30 according to one embodiment of the data processor 14 as depicted in FIG. 4.

As diagramed in FIG. 4, gate control section 22 receiving data bit inputs above the threshold level from sampling section 20 organized in column groups sampled from left to right, transfer input pulses to column counters 38 and through shift registers 40 to row counters 44. The totals of the pulses derived from the two half segments of the column groups of data bits, respectively counted in parallel by half of the column counters 38, are registered and transferred by parallel data busses 46 and 48 to a comparator 50 of the memory section 26. The total of the counted data bit pulses in the first half segment of each column group transferred by data bus 46 are subtracted from twice the total of the count of data bit pulses from the other half segment transferred at the same time by data bus 48 to comparator 50, in order to obtain therefrom an offset output (ex) of the scanned digital pattern from the centroid 30 of the sensor array in the X-direction. Such offset output of the comparator is fed to the offset readout section 28 as shown in FIG. 4.

During the foregoing vertical column scanning and counting operation, the data bit pulses are fed from gate 22 to the row counters 44 through the shift registers 40 so as to limit counting to those sequences of pulses derived from horizontally aligned data bits forming the rows of the sensor array as aforementioned. Operation of the row counters 44 are furthermore controlled by an up/down control 54 so as to obtain a difference between the totals of the data bits counted above and below the centroid 30, representing the vertical offset (ey). Such offset output of the row counters 44 is fed to the offset readout section 28 as shown in FIG. 4.

In accordance with another embodiment of the invention as depicted in FIG. 5, the data bits exhibited by the sensor array are scanned both vertically and horizontally, alternately, by a data sampling scanner 18'. The outputs of scanner 18' are fed through a multiplexer 56 and threshold detector section 20 to a gate section 22' from which data bit pulses are transmitted in parallel to column and row counters 38 and 44'. Each set of counters 38 and 44' transfers data bit pulse counts in parallel through data buses 46 and 48, as described with respect to counters 38 in FIG. 4, to comparators 50 and 58 to obtain offset outputs in X and Y directions fed to the offset readout 28.

According to the embodiment diagramed in FIG. 6, the offset in one direction is determined by the column counters 38 and comparator 50 as described with respect to FIG. 4 while data pulses are being transferred in parallel through shift registers 40 to row counters 44''. As each of the shift registers 40 receives a pulse corresponding to a data bit in a horizontal row, the preceding shift register undergoes a serial shift to a corresponding one of the row counters 44'' under control of the up/down count control 54' for staggered parallel loading of the row counters 44'' from which an offset output in the other direction is obtained and fed to the offset memory 52 through memory register 56.

FIG. 7 illustrates yet another embodiment of the invention in which the threshold detector section 20 diagramed in FIG. 2 is eliminated while a data processor 14' otherwise conforms to the arrangement and operation as described with respect to FIG. 6. As shown in FIG. 7, the output of the sensor array is fed into a multiplexer 58 for transfer to an analog-to-digital converter 60. The digital output of the converter 60 is fed to one input of a digital comparator 62, having its reference input connected to an amplitude control 64. The digital output of the comparator 62 is thereby so controlled that the signal threshold level determining the binary "one" value, as hereinbefore referred to, may be dynamically varied as the sensor array approaches the target. The output of comparator 62 is interrogated through de-multiplexer 66 by the data processor 14' as described with respect to FIG. 6. Thus, as the distance between sensor array and target decreases, the increasing signal threshold level will accommodate the increasing signal intensity of the radiation impinging on the sensor array to improve signal discrimination and tracking dynamics. The image detected by the array 10 may thereby also produce image data reflecting such signal intensity variable.

FIG. 8 diagrams an arrangement basically similar to that of FIG. 7, including a multiplexer 58 and an analog-to-digital converter 60 through which the digital pattern derived from the sensor array 10 is interrogated by a data processor 14'. In accordance with the embodiment of FIG. 8, the output of the converter 60 may be transferred to the data processor 14' and to a memory 68. When the memory 68 is addressed, the digital data is converted back to analog form through converter 70 for display of array data reproduced on screen 72 with variable tones based on the image received by the sensor array 10.

Numerous modifications and variations of the present invention are possible in light of the foregoing teachings. It is therefore to be understood that within the scope of the appended claims the invention may be practiced otherwise than as specifically described.

What is claimed is:

1. In a system for interrogating information acquired by a sensor array having a centroid, sampling means operatively connected to the sensor array for sequential scanning of separate groups of data bits from the sensor array, detector means operatively connected to the sampling means for detecting the scanned data bits in each of said groups above a preset threshold level forming digital patterns, counter means operatively connected to the detector means for simultaneously counting the detected data bits above said preset threshold level within segments of each of said groups to register totals thereof and data processing means operatively connected to the counter means and responsive to differences between the registered totals simultaneously counted for each of the groups respectively for determining offsets of the digital patterns from the centroid of the sensor array.

2. The system as defined in claim 1 wherein said digital patterns have target aimpoints spaced by said offsets from the centroid of the sensor array.

3. The system of claim 2 including target tracking means connected to the data processing means for correctively displacing the sensor array to reduce said offsets toward zero.

4. In a tracking system for spatial quantization of target images detected as binary patterns of data bits derived from an array having a centroid, data processing means for determining offset of the binary patterns with respect to the centroid of said array, comprising data sampling means operatively connected to the array for sequentially scanning separate groups of the data bits, counter means operatively connected to the data sampling means for simultaneously counting segments of each of the groups of the data bits scanned to register summations thereof and readout means operatively connected to the counter means and responsive to differences between said summations of the data bits within the segments of each of the groups respectively for indicating the offset of the target images.

5. The target tracking system as defined in claim 4 including display means connected to the readout means of the data processing means for reproduction of the target images detected by the array with tone variation.

6. In combination with a sensor exhibiting an array of data bits arranged in groups from which a digital pattern is derived, a method comprising the steps of: simultaneously counting the data bits forming separate segments of each of the groups; registering totals of the simultaneously counted data bits of the segments within each of the separate groups; calculating the differences between the registered totals of the simultaneously counted data bits in the segments of the separate groups; and determining offset of the digital pattern relative to the array from said calculated differences.

7. The method of claim 6, further including the step of: controllably displacing the sensor until the determined offset approaches zero.

* * * * *